United States Patent [19]

Denton

[11] 4,308,938
[45] Jan. 5, 1982

[54] DISC BRAKE ASSEMBLY AND METHOD
[75] Inventor: Dennis N. Denton, Gastonia, N.C.
[73] Assignee: Garlock Inc., Longview, Tex.
[21] Appl. No.: 14,354
[22] Filed: Feb. 23, 1979
[51] Int. Cl.³ .............................................. F16D 65/02
[52] U.S. Cl. ................... 188/73.45; 308/238
[58] Field of Search ............................. 188/72.4, 73.3;
308/238; 92/168, DIG. 1

[56] References Cited
U.S. PATENT DOCUMENTS

| | | | |
|---|---|---|---|
| 3,097,893 | 7/1963 | White | 308/238 |
| 3,372,960 | 3/1968 | Fisher | 308/238 |
| 3,375,906 | 4/1968 | Hayes | 188/73.3 |
| 3,442,354 | 5/1969 | Belart | 188/73.3 |
| 3,779,828 | 12/1973 | Clark | 308/238 |
| 4,039,053 | 8/1977 | Meyer et al. | 188/73.3 |
| 4,194,597 | 3/1980 | Evans et al. | 188/73.3 |

FOREIGN PATENT DOCUMENTS 1388116  3/1975 United Kingdom ................ 308/238

OTHER PUBLICATIONS

"Chrysler Corp. Service Manual for the 1978 Plymouth Horizon–Dodge Omni", pp. 5-18 and 5-19.

Primary Examiner—Edward R. Kazenske
Attorney, Agent, or Firm—Schovee & Boston

[57] ABSTRACT

A disc brake assembly 10 and method for preventing binding of disc brake caliper slider pins 34 in bushing seals 14 of a disc brake caliper 18. The bushing seal 14 is a unitary, molded, tubular article including a molded tubular elastomeric body 44 having a hydraulically formed tubular polytetrafluoroethylene liner 46 bonded to the I.D. of the elastomeric body and having a polytetrafluoroethylene scraper lip 48 adjacent the inboard end 50 of the bushing seal for scraping foreign particles off of the slider pin 34 to keep them out of the bushing seal 14 where they could cause binding. The bushing seal 14 also has a smooth tapering O.D. surface such that it can be easily installed in a slider pin bore 30.

13 Claims, 3 Drawing Figures

DISC BRAKE ASSEMBLY AND METHOD

TECHNICAL FIELD

This invention relates to disc brakes for rotating members such as automotive vehicle wheels.

BACKGROUND OF THE PRIOR ART

Current practice in the automotive brake industry uses an elastomeric bushing with a hand-inserted cylindrical polytetrafluoroethylene liner in the slider pin bore of the disc brake caliper as shown in FIGS. 8 and 9 of U.S. Pat. No. 4,228,726. The axial length of the liner is shorter than that of the elastomeric bushing and is designed to fit into a recess in the I.D. of the elastomeric bushing. Such prior art liner does not extend all the way to the outboard end of the elastomeric body and does not have a radially inwardly extending scraper lip. The prior art polytetrafluoroethylene liner is formed from a square of material into a split circular tube. Such liner does not always conform to the inside wall of the elastomeric bushing, making it susceptible to installation damage and sometimes removable from its working position. For example, during assembly, it is common for the polytetrafluoroethylene liner to be pushed out of the elastomeric bushing. Further, such prior art elastomeric bushing includes a pair of radially outwardly extending flanges, defining therebetween an O.D. groove in which the caliper bore is received. The forward or inboard one of the two flanges makes installation of the elastomeric bushing virtually impossible without first folding the bushing, again relying on manual procedures. If the polytetrafluoroethylene liner were placed in the bushing prior to inserting the bushing in the bore, it would probably be impossible to fold the bushing as needed for installation. Further, the known practice does not sufficiently seal against foreign particles entering into the bushing where they can cause the slider pin to bind within the bushing. This causes excessive wear of the brake lining on the inboard disc brake pad. Further, in the current practice, the purchasing, inventory, handling and assembly are relatively expensive since two separate parts are involved.

It is an object of the present invention to provide an improved disc brake assembly and method which overcome the problems in the prior art such as those described above. It is another object of the present invention to provide a disc brake assembly and method which employ a unitary, one-piece, molded tubular bushing seal including a molded tubular elastomeric body having a hydraulically formed tubular polytetrafluoroethylene liner bonded to the I.D. of the elastomeric body and having a polytetrafluoroethylene scraper lip adjacent the inboard end of the bushing seal for scraping dirt and other foreign particles off of the slider pin as the slider pin and bushing seal more relative to each other. It is an object and advantage of the present invention to prevent binding between a disc brake slider pin and the bushing seal of a disc brake caliper thus preventing excessive wear of the lining of the inboard disc brake pad. It is another object and advantage of the present invention to reduce the cost of purchasing, inventory, handling and assembly of a disc brake assembly. It is another object and advantage of the present invention to provide for faster and improved installation of a disc brake assembly without requiring a high degree of manual dexterity.

BRIEF SUMMARY OF THE INVENTION

The present invention is in a disc brake assembly and method for preventing binding of a disc brake caliper slider pin in a bushing seal of a disc brake caliper when the caliper moves with respect to the slider pin during braking and in particular when taking up the slack caused by wear of the brake pads. The bushing seal of the present invention is a unitary, one-piece, molded, tubular article including a molded, tubular elastomeric body having a hydraulically formed tubular polytetrafluoroethylene liner bonded to the I.D. of the elastomeric body and having a polytetrafluoroethylene scraper lip adjacent the inboard end of the bushing seal for scraping foreign particles off of the slider pin to keep them out of the bushing seal where they could cause binding resulting in reduced braking effectiveness and excessive wear of the lining of the inboard disc brake pad.

BRIEF DESCRIPTION OF DRAWINGS

The present invention will be more fully understood by reference to the following detailed description thereof, when read in conjunction with the attached drawings, wherein like reference numerals refer to like elements and wherein.

DETAILED DESCRIPTION OF INVENTION

Figure 1:
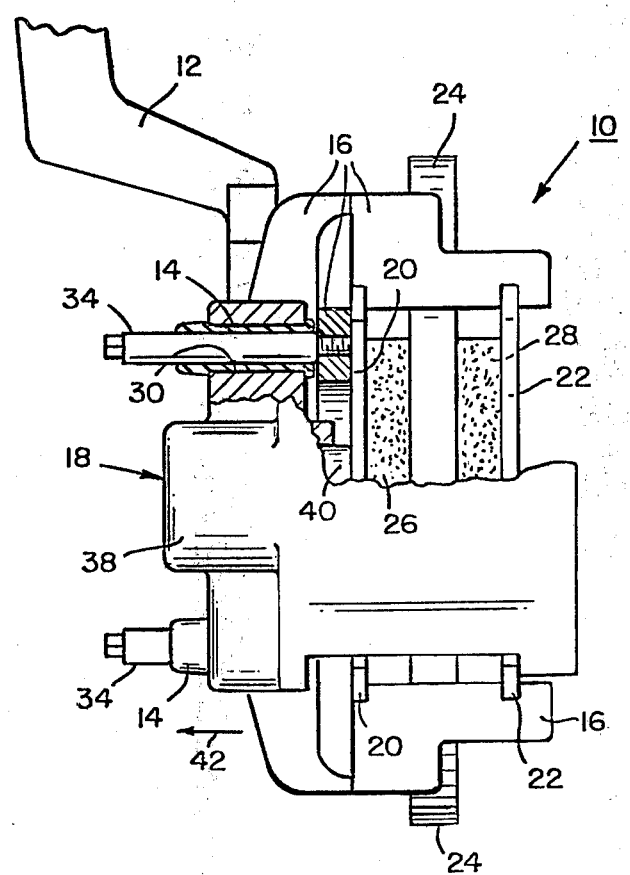
FIGS. 1 and 2 are partial cross-sectional plan views of a disc brake assembly according to the present invention and attached to a vehicle, with FIG. 1 showing the assembly with new brake linings and FIG. 2 showing the assembly with worn linings and the caliper moved on the slider pins to take up the wear.
Figure 2:
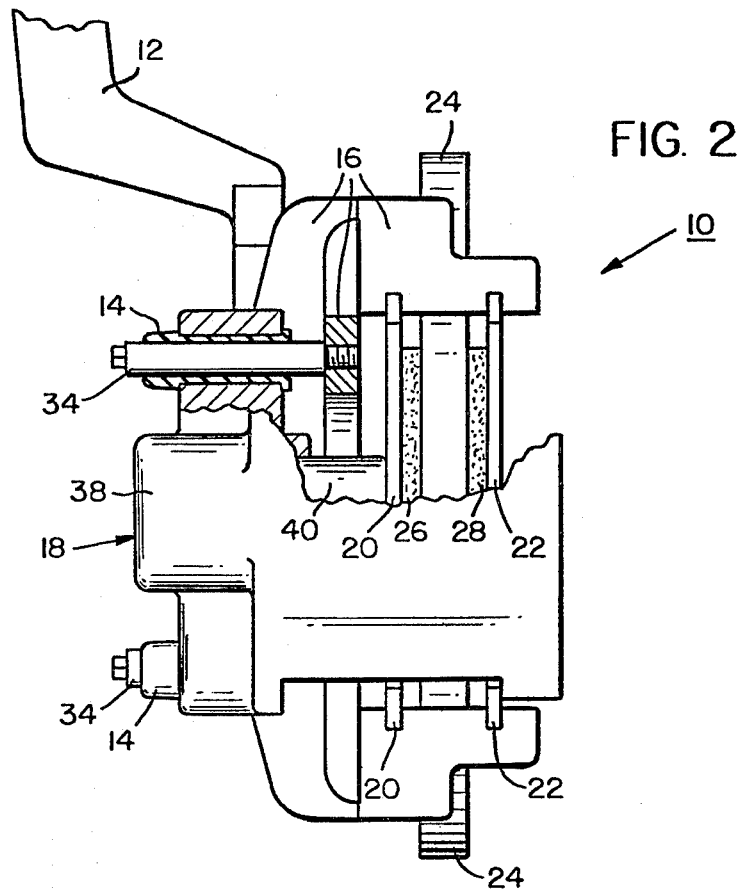

With reference now the the drawings, FIGS. 1 and 2 show a disc brake assembly 10 according to the present invention attached to a part 12 of a vehicle such as an automobile. FIGS. 1 and 2 are the same except that in FIG. 1 the brake linings 26 and 28 are new and in FIG. 2 they are worn and the caliper 18 has moved in FIG. 2 relative to the adaptor 16 and the slider pins 34 to take up this amount of wear. In both FIGS. 1 and 2, the brakes are shown engaged in braking contact with the braking disc 24.

Figure 3:
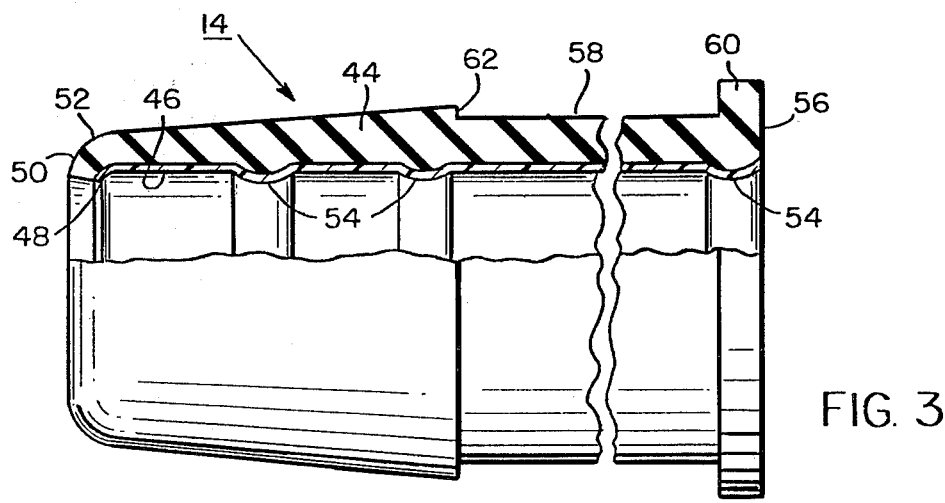
FIG. 3 is a partial, partly cross-sectional view of a bushing seal used in the disc brake assembly of the present invention.

The disc brake 10 is a standard disc brake assembly except for the slider pin bushing seal 14 (shown more fully in FIG. 3). Thus, a detailed description of the disc brake assembly 10 is not required because the nature and operation thereof are well-known to those skilled in the art. Briefly, however, the disc brake assembly 10 includes an adaptor 16 adapted to be attached (such as by bolts) to a part 12 of a vehicle, a caliper 18 movably mounted on the adpator 16, and a pair of disc brake pads 20 and 22 positioned on opposite sides of a braking disc 24 rotating with a wheel (not shown) of the vehicle. The outboard pad 22 has a brake lining 28 and the inboard pad 20 has a brake lining 26. The terms "inboard" and "outboard" as known in this art refer to being inwardly and outwardly with respect to the vehicle. In FIGS. 1, 2, and 3 the inboard side is to the left and the outboard side is to the right.

The caliper includes, in the particular disc brake assembly 10 shown in FIGS. 1 and 2, a pair of slider pin bores 30. A bushing seal 14 is inserted into each of the bores 30. A pair of slider pins 34 are connected to the adaptor 16 (such as by screw threads on the outboard end of the slider pins being screwed into internally screw threaded bores in the adaptor) and the slider pins are relatively tightly installed (such as by manually pushing) through the bushing seals 14. The caliper 18 can move relative to the adaptor 16 by the bushing seals 14 sliding over and relative to the satisfactory slider pins 34.

As will be understood by those skilled in the art, the caliper 18 includes a cylinder 38, a piston 40 and a hydraulic fluid inlet (not shown) to the chamber inside of the cylinder 38. When the operator of the vehicle presses on the brake pedal, hydraulic fluid pressure forces the piston 40 against the inboard pad 20; after the inboard pad contacts the disc 24, the hydraulic pressure then causes the caliper 18 to move in an inboard direction thus also bringing the outboard pad 22 into braking contact with the disc 24. The caliper 18 moves by the bushing seals 14 sliding on the slider pins 34. As the brake pad linings 26 and 28 wear, the caliper 18 must move further in an inboard direction (see arrow 42 in FIG. 1) with respect to the slider pins 34. In the prior art, the bushing and slider pin could bind preventing such needed movement of the caliper, because the prior art bushing allowed foreign particles to enter between the bushing and the slider pin.

This type of disc brake assembly is shown in more detail, for example, at pages 5–15 to 5–22 of the Chrysler Corporation Service Manual for the 1978 Plymouth Horizon-Dodge Omni.

FIG. 3 is an enlarged view of the bushing seal 14 of the present invention. The bushing seal 14 is a unitary, one-piece, molded, tubular bushing seal including a molded, tubular elastomeric body 44 having a hydraulically formed (during the molding process), tubular polytetrafluoroethylene liner 46 bonded to the I.D. of the elastomeric body. The liner 46 includes a polytetrafluoroethylene scraper lip 48 adjacent the inboard end 50 of the bushing seal. The scraper lip 48 preferably tapers radially inwardly at the distal end thereof where it can be separated from the elastomeric body 44 (such as by shrinkage after the molding process). The bushing seal 14 includes a reduced, tapered O.D. surface 52, a plurality of annular, radially inwardly extending ridges 54 on the I.D. surface thereof for loading and support, and an O.D. groove 58 for matingly receiving the slider pin bore 30 of the caliper 18. The O.D. groove 58 is defined at the outboard end thereof by a radially outwardly extending flange 60 and at the inboard end thereof by a shoulder 62. The O.D. surface 52 tapers smoothly from the inboard end of the bushing seal 14 all the way to the groove 58. There is no radially outwardly extending flange requiring the bushing seal 14 to be folded in order to insert it into the slider pin bore 30; it can simply be pushed directly into the bore 30 in the direction of the arrow 42 in FIG. 1. One of the ridges 54 adjacent the outboard end 56 of the bushing seal 14 serves as a seal to prevent entry into the bushing seal of dirt, road splash, etc.

It will be seen from FIGS. 1 and 2 that the scraper lip 48 of the bushing seal 14 serves to scrape dirt and other foreign particles off of the slider pin 34 for keeping such particles out of the contact area between the bushing seal 14 and the slider pin 34 where such particles could cause binding of the slider pin and the bushing seal. Such binding could prevent the caliper 18 from moving which would cause excessive wear of the lining of the inboard brake pad 20. While the scraper lip 48 and the outboard ridge 54 prevent contaminents from entering between the bushing seal 14 and the slider pin 34 even during the normal small amount of movement of the caliper 18 during normal braking operation, the scraper lip 48 is particularly effective when the caliper 18 must move an additional distance along the slider pin 34 as a result of wear of the brake linings 26 and 28. Thus, it will be seen that the bushing seal 14 has a new cooperative relationship with the remainder of the disc brake assembly particularly in the manner of installation in the caliper and in preventing binding between the slider pin and the bushing seal. Thus, it will be seen that the scraper lip 48 of the liner 46 is bonded to and is in direct contact with a portion of the elastomeric body 44. Such portion of the elastomeric body 44 is located directly radially outwardly from the scraper lip 48 and is solid and continuous throughout its radial dimension, such that said portion provides an elastomeric backing for holding the scraper lip in scraping contact with the slider pin.

The bushing seal 14 can be made by compression molding, injection molding or transfer molding. One preferred embodiment for making the bushing seal 14 is to insert an extruded polytetrafluoroethylene tube into an extruded elastomeric tube, placing the two tubes together onto a mold core pin and then sandwiching the pin between two halves of a mold and placing the mold into a molding press whereby pressure and heat are applied to form the bushing seal. After the molding cycle is completed, one half of the mold is removed and the pin is lifted out. The bushing seal is then pulled from the core pin and the flash removed such as by the tear bead method.

The invention has been described in detail with particular reference to the preferred embodiments thereof, but it will be understood that variations and modifications can be affected within the spirit and scope of the invention as described hereinafter and as defined in the appended claims. For example, while the preferred use of the disc brake assembly and method of the present invention is on automotive vehicles, other uses are possible, such as for braking any type of rotating members such as various types of flywheels, pulleys, etc.

I claim:

1. A method for preventing binding of a disc brake slider pin in a bushing of a disc brake caliper comprising:

(a) inserting, into a slider pin bore of a disc brake caliper, a unitary, one-piece, molded, tubular bushing seal including a molded tubular elastomeric body and a simultaneously hydraulically formed tubular polytetrafluoroethylene liner bonded to the inside diameter of said elastomeric body, said liner including a polytetrafluoroethylene scraper lip adjacent the inboard end of said bushing seal for scraping foreign particles off of the below-recited slider pin as said caliper and bushing seal move relative to said slider pin, said scraper lip portion of said liner being bonded to and being in direct contact with a portion of said elastomeric body, said portion of said elastomeric body being located directly radially outwardly from said scraper lip and being solid and continuous throughout its radial dimension such that said portion of said body provides an elastomeric backing for holding said scraping lip in scraping contact with said slider pin, and (b) installing a disc brake slider pin through said bushing seal, such that said polytetrafluoroethylene scraper lip is in scraping contact with said slider pin.

2. The method according to claim 1 wherein said bushing seal has a reduced, tapered outside diameter surface adjacent the inboard end thereof providing for easy installation thereof through said bore.

3. The method according to claim 1 wherein said caliper includes two parallel, spaced-apart slider pin bores, and including inserting one of said bushing seals in each of said slider pin bores in said caliper.

4. The method according to claim 1 including connecting the outboard end of said slider pin to a disc brake adaptor associated with a pair of disc brake pads, and mounting said adaptor, caliper and pads on a vehicle with said pads on opposite sides of a braking disc, whereby as said caliper moves further inboard as said pads wear, said polytetrafluoroethylene scraper lip scrapes foreign particles off of the inboard portion of said slider pin to prevent binding of said slider pin in said bushing seal.

5. The method according to claim 4 wherein said adaptor and caliper include two of said slider pins, one each in parallel spaced-apart slider pin bores in said caliper, and including inserting one of said bushing seals in each of said slider pin bores in said caliper.

6. The method according to claim 1 including providing said bushing seal with an outside diameter groove adapted to receive said slider pin bore therein during installation, providing said bushing seal with a smooth outside diameter surface tapering from the inboard end thereof radially outwardly to said outside diameter groove, and wherein said inserting step consists simply of pushing said pushing seal into said slider pin bore, whereby said bushing seal need not be folded during installation.

7. The method according to claim 1 including locking said bushing seal in said slider pin bore between a radially outwardly extending flange and a shoulder of said bushing seal.

8. Apparatus comprising a disc brake assembly including an adaptor, at least one disc brake slider pin connected to said adaptor, a caliper having at least one slider pin bore, a bushing seal positioned in said at least one slider pin bore, said at least one slider pin being movably located inside of said at least one bushing seal whereby said caliper is movably mounted on said adaptor, and a pair of movable disc brake pads mounted on said adaptor, said at least one bushing seal comprising a unitary, one-piece, molded, tubular bushing seal including a molded, tubular, elastomeric body and a simultaneously, hydraulically formed tubular polytetrafluoroethylene liner bonded to the inside diameter of said elastomeric body, said liner having a polytetrafluoroethylene scraper lip adjacent the inboard end of said bushing seal in scraping contact with the outside diameter surface of said at least one slider pin extending therethrough, said scraper lip portion of said liner being bonded to and being in direct contact with a portion of said elastomeric body, said portion of said elastomeric body being located directly radially outwardly from said scraper lip and being solid and continuous throughout its radial dimension such that said portion of said body provides an elastomeric backing for holding said scraper lip in scraping contact with said slider pin.

9. The apparatus according to claim 8 wherein said at least one slider pin consists of two slider pins and wherein said at least one bushing seal consists of two bushing seals, and wherein said at least one slider pin bore consists of two slider pin bores.

10. The apparatus according to claim 9 wherein each of said bushing seals includes a reduced, tapered outside diameter surface adjacent the inboard end thereof to aid in the installation of each of said bushing seals through a respective one of said slider pin bores.

11. The apparatus according to claim 10 wherein each of said bushing seals includes an outside diameter groove for receiving a slider pin bore, a radially outwardly extending flange adjacent the outboard end of said groove, a shoulder adjacent the inboard end of said groove, and wherein said tapered outside diameter surface extends smoothly from said inboard end of said bushing seal to said groove, whereby each of said bushing seals can be inserted into a respective one of said slider pin bores by pushing without having to be folded.

12. The apparatus according to claim 9 wherein said polytetrafluoroethylene scraper lip of each of said bushing seals tapers radially inwardly at the distal end thereof into scraping contact with a respective one of said slider pins.

13. The apparatus according to claim 9 wherein each of said two bushing seals includes a radially inwardly extending annular ridge in the inside diameter thereof adjacent the outboard end thereof and extending into sealing contact with a respective one of said two slider pins for preventing contaminants from entering into said bushing seal.

* * * * *

UNITED STATES PATENT AND TRADEMARK OFFICE
CERTIFICATE OF CORRECTION

PATENT NO. : 4,308,938
DATED : January 5, 1982
INVENTOR(S) : Dennis N. Denton

It is certified that error appears in the above—identified patent and that said Letters Patent is hereby corrected as shown below:

In claim 1(a), line 19, delete "scraping", first occurrence, and insert therefor ---scraper---.

In claim 6, line 8, delete "pushing", second occurrence, and insert therefor ---bushing---.

Signed and Sealed this

Fourth Day of May 1982

[SEAL]

Attest:

GERALD J. MOSSINGHOFF

Attesting Officer   Commissioner of Patents and Trademarks